United States Patent
Mahdi

(10) Patent No.: US 10,110,975 B2
(45) Date of Patent: *Oct. 23, 2018

(54) INTER-DOMAIN CALL ROUTING

(75) Inventor: Kaniz Mahdi, Carrollton, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 5 days.

This patent is subject to a terminal disclaimer.

(21) Appl. No.: 13/620,744

(22) Filed: Sep. 15, 2012

(65) Prior Publication Data

US 2013/0012200 A1    Jan. 10, 2013

Related U.S. Application Data

(63) Continuation of application No. 11/452,069, filed on Jun. 12, 2006, now Pat. No. 8,542,670.

(Continued)

(51) Int. Cl.
*H04W 40/00* (2009.01)
*H04Q 3/66* (2006.01)
(Continued)

(52) U.S. Cl.
CPC ............ *H04Q 3/66* (2013.01); *H04L 65/103* (2013.01); *H04L 65/104* (2013.01);
(Continued)

(58) Field of Classification Search
CPC .......... H04M 7/1285; H04M 2207/18; H04M 2207/203; H04Q 3/66; H04Q 2213/13098; H04Q 2213/13141; H04Q 2213/13196; H04Q 2213/13248; H04Q 2213/13282; H04W 92/02; H04W 8/26; H04L 65/104;
(Continued)

(56) References Cited

U.S. PATENT DOCUMENTS 6,222,829 B1    4/2001 Karlsson et al.
7,804,951 B2 *  9/2010 Pelaez .................... H04L 12/66
                                                 379/211.03

(Continued)

OTHER PUBLICATIONS

European Examination Report; Application No. 06765506.8; dated Oct. 12, 2015; 6 pages.

(Continued)

*Primary Examiner* — Luat Phung
(74) *Attorney, Agent, or Firm* — Conley Rose, P.C.; J. Robert Brown, Jr.; Robert E. Kent

(57) ABSTRACT

The present invention provides for routing calls between disparate domains, such as a circuit-switched subsystem and a multimedia subsystem. When a user element is homed in a first domain and roaming in a second domain, an incoming call will arrive at a gateway node in the first domain. As a result, a message identifying the user element and indicating that an incoming call has been received at first gateway node for the first domain is sent to a continuity control function (CCF) residing in the multimedia subsystem. The CCF will create and effect delivery of an inter-domain routing number to the first gateway node. The inter-domain routing number is used by the first gateway node to route the call to the second domain. The inter-domain routing number may be associated with a second gateway node of the second domain.

20 Claims, 6 Drawing Sheets

Related U.S. Application Data

(60) Provisional application No. 60/689,883, filed on Jun. 13, 2005.

(51) Int. Cl.

| | | |
|---|---|---|
| *H04M 7/12* | (2006.01) | |
| *H04W 92/02* | (2009.01) | |
| *H04L 29/06* | (2006.01) | |
| *H04W 8/26* | (2009.01) | |

(52) U.S. Cl.
CPC ...... *H04L 65/1006* (2013.01); *H04L 65/1069* (2013.01); *H04M 7/1285* (2013.01); *H04W 92/02* (2013.01); *H04L 65/1016* (2013.01); *H04M 2207/18* (2013.01); *H04M 2207/203* (2013.01); *H04Q 2213/13098* (2013.01); *H04Q 2213/13141* (2013.01); *H04Q 2213/13196* (2013.01); *H04Q 2213/13248* (2013.01); *H04Q 2213/13282* (2013.01); *H04W 8/26* (2013.01)

(58) Field of Classification Search
CPC .............. H04L 65/1069; H04L 65/103; H04L 65/1006; H04L 65/1016
See application file for complete search history.

(56) References Cited

U.S. PATENT DOCUMENTS

| | | | | |
|---|---|---|---|---|
| 8,542,670 | B2* | 9/2013 | Mahdi | 370/352 |
| 2002/0196775 | A1 | 12/2002 | Tuohino et al. | |
| 2003/0027595 | A1* | 2/2003 | Ejzak | 455/560 |
| 2003/0166403 | A1* | 9/2003 | Hammer et al. | 455/445 |
| 2004/0028080 | A1* | 2/2004 | Samarasinghe | H04L 65/1006 370/486 |
| 2004/0068533 | A1* | 4/2004 | Tenhunen | H04M 3/42 709/200 |
| 2004/0184435 | A1* | 9/2004 | Westman | 370/349 |
| 2005/0058125 | A1* | 3/2005 | Mutikainen et al. | 370/354 |
| 2005/0125543 | A1* | 6/2005 | Park | H04L 65/1006 709/227 |
| 2006/0105766 | A1* | 5/2006 | Azada et al. | 455/432.1 |
| 2006/0211423 | A1* | 9/2006 | Ejzak et al. | 455/445 |
| 2007/0026862 | A1* | 2/2007 | Hicks, III | H04W 36/30 455/436 |
| 2007/0100981 | A1* | 5/2007 | Adamczyk | H04L 69/18 709/223 |
| 2007/0220005 | A1* | 9/2007 | Castro Castro | H04W 4/08 |
| 2008/0261595 | A1* | 10/2008 | Westman | 455/435.2 |
| 2008/0316998 | A1* | 12/2008 | Procopio | H04M 7/123 370/352 |

OTHER PUBLICATIONS

Mahdi, Kaniz; U.S. Appl. No. 11/452,069, filed Jun. 12, 2006; Title: Inter-Domain Call Routing.

3GPP TS 23.221 V6.3.0; 3rd Generation Partnership Project; Technical Specification Group Services and System Aspects; Architectural Requirement; Release 6; Jun. 2004; 39 pages.

3GPP TS 23.228 V6.9.0; 3rd Generation Partnership Project; Technical Specification Group Services and System Aspects; IP Multimedia Subsytem (IMS); Release 6; Mar. 2005; 179 pages.

Haase, Oliver, et al.; "Unified Mobility Manger—Enabling Efficient SIP/UMTS Mobile Network Control"; IEEE; Aug. 2003; 12 pages.

Office Action dated Jul. 21, 2010; U.S. Appl. No. 11/452,069, filed Jun. 12, 2006; 13 pages.

Final Office Action dated Feb. 23, 2011; U.S. Appl. No. 11/452,069, filed Jun. 12, 2006; 11 pages.

Office Action dated Jul. 19, 2012; U.S. Appl. No. 11/452,069, filed Jun. 12, 2006; 11 pages.

Notice of Allowance dated May 24, 2013; U.S. Appl. No. 11/452,069, filed Jun. 12, 2006; 18 pages.

PCT International Search Report; Application No. PCT/IB2006/001556; dated Dec. 27, 2006; 2 pages.

PCT Written Opinion of the International Searching Authority; Application No. PCT/IB2006/001556; dated Dec. 27, 2006; 5 pages.

European Extended Search Report; Application No. 06765506.8; dated Nov. 20, 2014; 6 pages.

European Extended Search Report; Application No. 16200896.5; dated Apr. 21, 2017; 11 pages.

\* cited by examiner

INTER-DOMAIN CALL ROUTING

This application claims the benefit of U.S. provisional patent application 60/689,883 filed on Jun. 13, 2005, the disclosure of which is hereby incorporated by reference in its entirety.

FIELD OF THE INVENTION

The present invention relates to communications and in particular to establishing calls over circuit-switched subsystems and packet subsystems.

BACKGROUND OF THE INVENTION

Packet communications have evolved to a point where voice sessions, or calls, can be supported with essentially the same quality of service as provided by circuit-switched communications. Packet communications are generally supported over packet subsystems, which were initially supported by local area networks, but are now supported by wireless local area networks (WLANs). Using WLAN access, user elements can support voice sessions using packet communications while moving throughout the WLAN. As such, WLAN access provides users the same freedom of movement within a WLAN as cellular access provides users within a cellular environment.

In many instances, the coverage areas provided by WLANs and cellular networks are complementary. For example, a WLAN may be established within a building complex in which cellular coverage is limited. Given the localized nature of WLAN coverage, cellular networks could bridge the coverage gaps between WLANs. Unfortunately, WLAN access technology is independent of cellular access technology. Cellular networks generally support circuit-switched communications, and WLANs support packet communications. As such, user elements have been developed to support both cellular and WLAN communications using different communication interfaces. With these user elements, users can establish calls via the cellular network and WLAN using the respective communication interfaces; however, establishing and controlling calls in a first domain is difficult when a user element is homed to a second domain. Further, once such calls are established, there is at best limited ability to maintain control over the calls and to provide services associated with the calls.

Accordingly, there is a need for a technique to effectively and efficiently establish calls for a user element over both cellular networks and WLANs as well as provide seamless control for established calls between the respective domains.

SUMMARY OF THE INVENTION

The present invention provides for routing calls between disparate domains, such as a circuit-switched subsystem and a multimedia subsystem. When a user element is homed in a first domain and roaming in a second domain, an incoming call will arrive at a gateway node in the first domain. As a result, a message identifying the user element and indicating that an incoming call has been received at first gateway node for the first domain is sent to a continuity control function (CCF) residing in the multimedia subsystem. The CCF will create and effect delivery of an inter-domain routing number to the first gateway node. The inter-domain routing number is used by the first gateway node to route the call to the second domain. The inter-domain routing number may be associated with a second gateway node of the second domain.

Once the call is routed to the second gateway node, the CCF may be accessed to further control routing of the call within the second domain to the user element. If the first domain is a circuit-switched subsystem and the second domain is a multimedia subsystem, the CCF will obtain an address associated with the user element in the multimedia subsystem and send a session request toward the user element to establish the call with the user element. The inter-domain routing number may be created based on a user element identifier, an address for the CCF, and a call or session reference identifier.

If the first domain is a multimedia subsystem and the second domain is a circuit-switched subsystem, the CCF will obtain a user element identifier based on the inter-domain routing number and send instructions for the second gateway to route the call to the user element via the circuit-switched subsystem. The instructions may include the user element identifier, such as a Mobile Subscriber Integrated Services Digital Network number (MSISDN). To initially determine how to route the call, the CCF may access one or more location registers associated with the circuit-switched subsystem and the multimedia subsystem to determine that the user element is roaming in the circuit-switched subsystem, even though the user element is homed to the multimedia subsystem.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
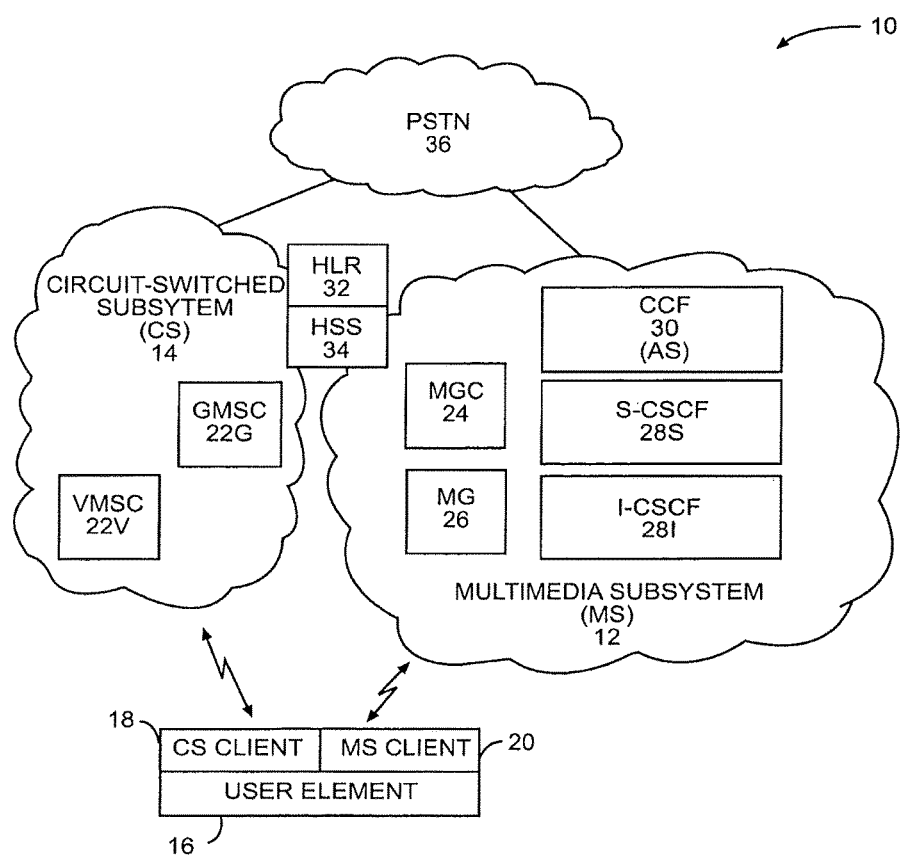
FIG. 1 is a communication environment illustrating a circuit-switched subsystem and a multimedia subsystem, which provide access for a user element, according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides for routing calls for a user element between a cellular network and a multimedia subsystem (MS), such as the Internet Protocol (IP) Multimedia Subsystem (IMS). For clarity and conciseness, a cellular network providing circuit-switched communications is referred to as circuit-switched subsystem (CS), and a WLAN providing packet communications is assumed to be part of or associated with the MS. A public switched telephone network (PSTN) may be operatively connected to the CS and MS.

The MS and CS are generically referred to as domains, and the present invention operates to route calls from one domain to another depending on the domain where the user element is homed and the domain where a roaming user element is currently registered. A continuity control function (CCF) in the MS may be employed to facilitate such routing in either direction. For example, when a roaming user element is homed in the CS and registered in the MS, the CCF may be used to provide the CS with a routing number for an incoming call. The routing number is configured to allow the CS to route the call to the MS, which will then route the call to the user element. Alternatively, when a roaming user element is homed in the MS and registered in the CS, the CCF may be used to provide the MS with a routing number for an incoming call. The routing number is configured to allow the MS to route the call to the CS, which will then route the call to the user element. Various entities may be employed to assist in call routing.

When the user element is homed in the MS, call control for originating and terminating calls in the CS or MS as well as transferring calls between the CS and MS may be anchored at the CCF in the MS. Call signaling for the call is passed through the CCF. The CCF is a service provided in the user element's MS and anchors the user element's active CS calls and MS sessions to enable mobility across the CS and MS while maintaining CS calls or MS sessions. The CCF is addressable using public service identities (PSI). In the CS, a directory number associated with the CCF is used for routing call signaling messages within the CS. In the MS, a uniform resource location (URL) associated with the CCF is used for routing call signaling messages within the MS. When the user element is homed in the CS, normal call signaling may be anchored at the mobile switching center to which the user element is homed.

In general, wireless communication techniques having relatively limited range, such as WLAN techniques, are referred to as local wireless communication techniques. Thus, local wireless communication techniques support packet-based communications, wherein cellular communication techniques will generally support circuit-switched communications. Further, the wireless access for local wireless techniques are of a limited range with respect to cellular access techniques. Prior to delving into the details of the present invention, an overview of a communication environment in which the present invention may be employed is provided.

Turning now to FIG. 1, a communication environment 10 is illustrated according to one embodiment of the present invention. In the communication environment 10, an MS 12 and a visited CS 14 support communications for a user element 16. The user element 16 includes a CS client 18 and an MS client 20, which are communication clients configured to support circuit-switched communications via the CS 14 as well as packet communications via the MS 12, respectively. For communications within the CS 14, either a gateway mobile switching center (GMSC) 22G or a visited mobile switching center (VMSC) 22V will support circuit-switched communications for the user element 16.

When the user element 16 is roaming in the MS 12 and is homed in the CS 14, incoming calls for the user element 16 are initially routed to the GMSC 22G, which will route the call towards the MS 12. When the user element 16 is roaming into the CS 14 and homed in the MS 12, incoming calls for user element 16 are ultimately routed to the VMSC 22V, which will connect the call with the user element 16. Both the VMSC 22V and the GMSC 22G may interact with the MS 12 via a media gateway controller (MGC) 24 and an associated media gateway (MG) 26, both of which are affiliated with the MS 12.

The MS 12 may include various functions or entities, including an interrogating call/session control function (I-CSCF) 28I, a serving call/session control function (S-CSCF) 28S, a CCF 30, a home location resource (HLR) 32, and a home subscriber service (HSS) 34. Notably, the HLR 32 and the HSS 34 may be implemented in the same or separate nodes and may be accessible by via the MS 12 and the CS 14. The I-CSCF 28I and the S-CSCF 28S in the MS 12 generally act as Session Initiation Protocol (SIP) proxies and provide various functions in association with call control, as will be appreciated by those skilled in the art. In operation, an I-CSCF 28I may interact with the HSS 34 to identify the S-CSCF 28S that is assigned to support a given user element 16. For the present invention, the HSS 34 may maintain an association between a user element 16 and a particular CCF 30 that is assigned to the user element 16. As such, the HSS 34 will assist in identifying an S-CSCF 28S for the user element 16, as well as keep an association between a particular CCF 30 and the user element 16. The CCF PSI for the user element 16 may be provisioned in the user element 16 to enable the user element 16 to initiate transfers and the like controlled by the CCF 30. Alternatively, the CCF PSI may be transferred to the user element 16 upon network registration. Further, the CCF 30 may be a service provided by an application server associated with the S-CSCF 28S.

Depending on whether the user element 16 is registered in the MS 12, different techniques may be used to access the MS 12. When the user element 16 is registered in the MS 12, the user element 16 will have an S-CSCF 28S assigned to it, and will use that S-CSCF 28S to access the CCF 30. When the user element 16 is not registered in the MS network 12, a temporary S-CSCF 28S may be assigned to the user element 16, and the temporary S-CSCF 28S will be used to access the CCF 30. Regardless of where the user element 16 is homed or is roaming, incoming calls may be originated from and outgoing calls may be terminated in the PSTN 36, which is operatively connected to the MS 12 and the CS 14.

In one embodiment of the present invention, the user element 16 is associated with a published directory number (or address), such as a an MSISDN, which is used by other parties to initiate calls to the user element 16. A CCF PSI is a published directory number associated with the CCF 30 and used to route incoming or outgoing calls associated with the user element 16 to the CCF 30 for call processing. An IP MS routing number (IMRN) is a routing number used to route calls into the MS 12 from the CS 14. The IMRN may have multiple components. For example, the IMRN may include a user element ID, the CCF PSI, and a call/session reference number. A CS routing number (CSRN) is a routing number used to route calls into CS 14 from the MS 12. The CCF 30 may be configured to manage the IMRN, the CSRN, or both.

When the user element 16 is homed in the CS 14 and roaming in the MS 12, an incoming call received from the PSTN 36 is initially presented to the GMSC 22G. In an effort to obtain routing information, the GMSC 22G will access the HLR 34. The HLR 34 is configured to direct the GMSC 22G to the CCF 30, which will provide the GMSC 22G with the IMRN. The GMSC 22G uses the IMRN to route the call to the media gateway controller 24, which can use the IMRN to route the call to the user element 16 via the CCF 30. In an alternative embodiment, the HLR 34 may be configured to provide the IMRN to the GMSC 22G.

Figure 2:
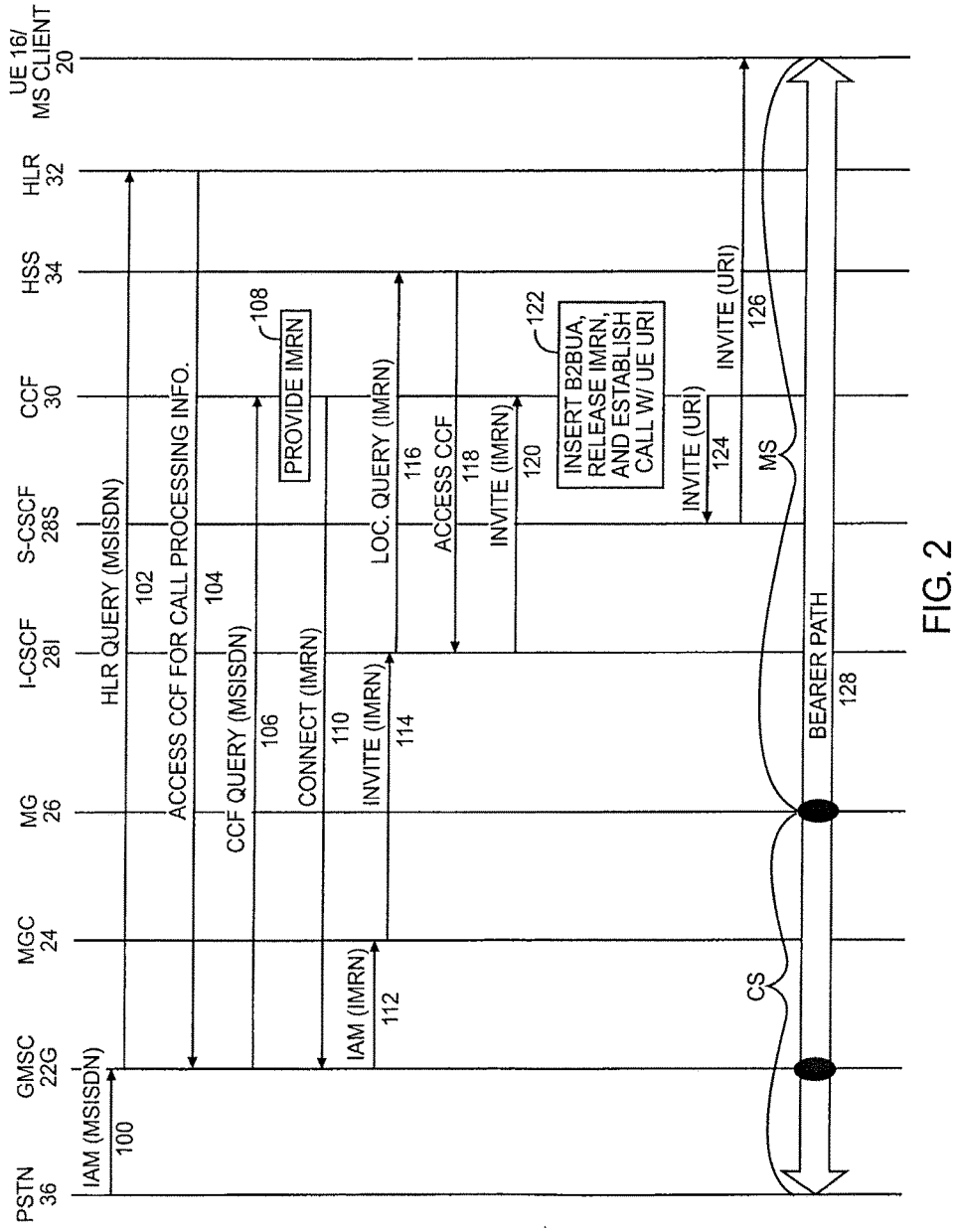
FIG. 2 shows a communication flow illustrating terminating an incoming call via the circuit-switched subsystem when the user element is homed in the circuit switched system and roaming in multimedia subsystem according to one embodiment of the present invention.

With reference to FIG. 2, a communication flow is provided wherein the user element 16 is homed in the CS 14 and roaming in the MS 12. Initially, a call originating in the PSTN 36 arrives at the GMSC 22G. Arrival of the incoming call is signified when the GMSC 22G receives an Initial Address Message (IAM) having the MSISDN of the user element 16 (step 100). The GMSC 22G will query the HLR 32 using the MSISDN in traditional fashion to obtain routing instructions for the call (step 102). In this instance, the HLR 32 will recognize that the user element 16 is currently being served by the MS 12, and as such will return instructions for the GMSC 22G to access the CCF 30 for call processing information (step 104). The GMSC 22G will send a CCF query with the MSISDN to the CCF 30 (step 106), which will provide the IMRN (step 108) and send the IMRN back to the GMSC 22G in a Connect message (step 110). As noted above, the IMRN may have various components, including an identifier for the user element 16, the CCF PSI, and the session/call reference information. The Connect message with the IMRN triggers the GMSC 22G to send an IAM to the media gateway controller 24 that is associated with the IMRN (step 112). The media gateway controller 24 may be associated with various ranges of IMRNs.

In response, the media gateway controller 24 will generate a SIP Invite or other session initiation message having the IMRN, and send the Invite to an appropriate I-CSCF 28I (step 114). To identify the application service providing the CCF 30, the I-CSCF 28I will access the HSS 34 using the IMRN. Accordingly, the I-CSCF 28I will send a location query having the IMRN to the HSS 34 (step 116), which will recognize that the IMRN is associated with the CCF 30. As such, the HSS 34 will send instructions for the I-CSCF 28I to access the CCF 30 (step 118). The I-CSCF 28I will then send an Invite having the IMRN to the CCF 30 using the appropriate CCF PSI (step 120).

At this point, the CCF 30 will insert a back-to-back user agent (B2BUA), release the IMRN, and establish the call with the user element 16 using the appropriate uniform resource identifier (URI) (step 122). The URI is associated with the MS client 20 of the user element 16 while it is being served by the MS 12. The IMRN is a temporary routing number used to route the call from the GMSC 22G to the CCF 30. Once the call is routed to the CCF 30, the IMRN is no longer required for the call and can be reused for other incoming calls to the same or different user elements.

To establish the call with the MS client 20 of the user element 16, the CCF 30 will send an Invite having the URI to the S-CSCF 28S that is currently serving the user element 16 (step 124). The S-CSCF 28S will then forward the Invite having the URI to the user element 16 (step 126). At this point, the requisite SIP messaging is passed back and forth between the media gateway controller 24 and the MS client 20 of the user element 16 via the CCF 30, S-CSCF 28S, and the I-CSCF 28I to establish a packet bearer path between the media gateway 26 and the MS client 20 of the user element 16. In the meantime, the GMSC 22G will establish a circuit-switched bearer path between the calling party's device and the media gateway 26 via the GMSC 22G. The CS and MS bearer paths are connected by the media gateway 26 to form the overall bearer path between the called party's device and the MS client 20 of the user element 16 (step 128).

The B2BUA is provided by the CCF 30 to terminate a signaling leg toward the calling party's device and establish another signaling leg toward the MS client 20 of the user element 16. Subsequently, the CCF 30 may coordinate call signaling between the two signaling legs. Although a B2BUA is a SIP agent, those skilled on the art will recognize other agents with similar functionality in other call or session control protocols. Notably, the terms "call" and "session" are used interchangeably to cover any type of media session.

When the user element 16 is homed in the MS 14 and roaming in the CS 12, an incoming call received from the PSTN 36 is initially presented to the media gateway controller 24. The media gateway controller 24 may appear as a GMSC on behalf of the MS 12 to which the user element 16 is homed. The media gateway controller 24 will route the call toward the CCF 30 via the I-CSCF 28I and the S-CSCF 28S. The CCF 30 will determine that the call should be routed into the CS 14 and provide a CSRN to the media gateway controller 24 for routing the call to the GMSC 22G. Using the CSRN, the media gateway controller 24 will route the call to the GMSC 22G. The GMSC 22G may then access the HLR 34 to obtain routing information leading to the VMSC 22V currently serving the user element 16.

Figure 3A:
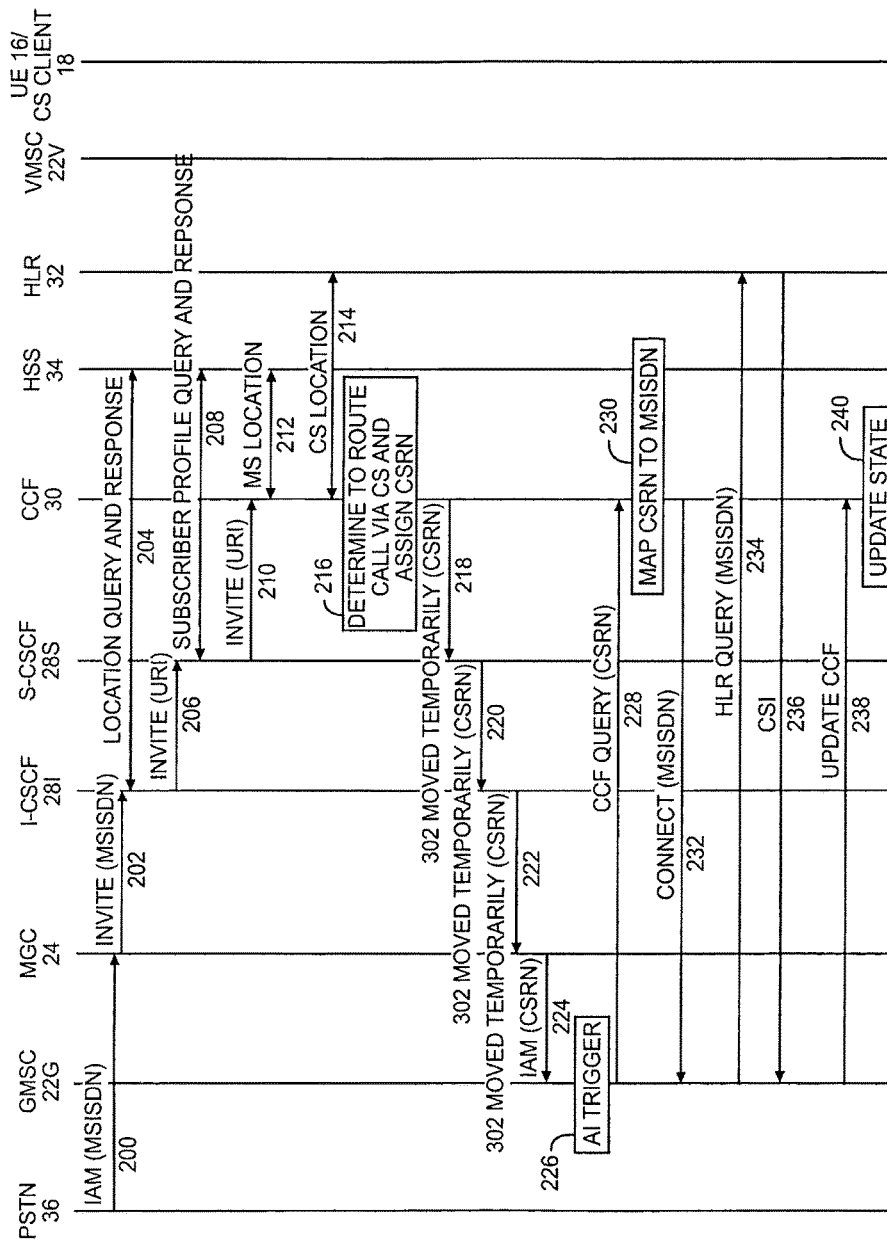
FIGS. 3A and 3B show a communication flow illustrating terminating an incoming call via the multimedia subsystem when the user element is homed in the multimedia system and roaming in circuit-switched subsystem according to one embodiment of the present invention.
Figure 3B:
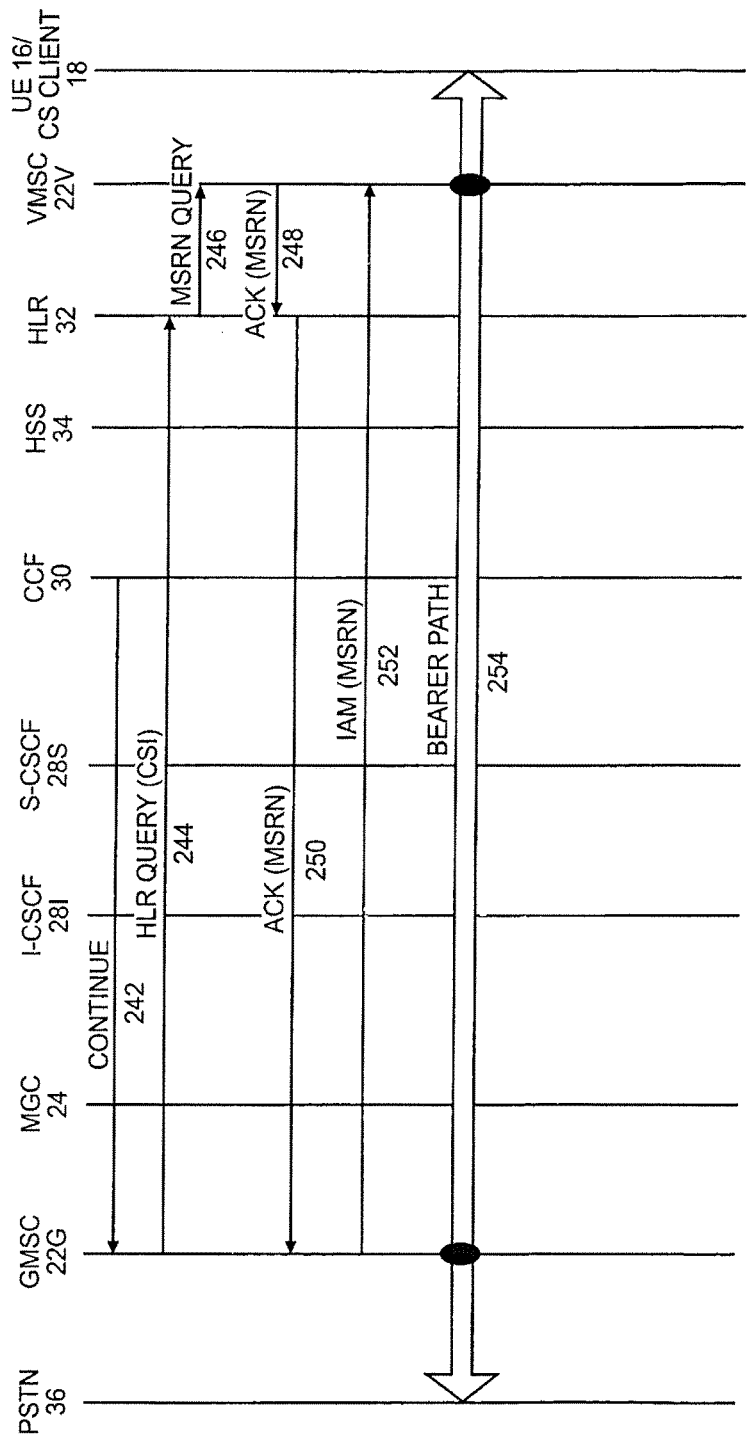

An exemplary communication flow for such a scenario is illustrated in FIGS. 3A and 3B. Initially, an incoming call from the PSTN 36 is received at the media gateway controller 24, which acts as a GMSC for the MS 12. The call arrives in the form of an IAM having the MSISDN associated with the user element 16 (step 200). In response, the media gateway controller 24 will initiate an Invite having the MSISDN to the I-CSCF 28I (step 202). The I-CSCF 28I will provide a location query to the HSS 34 to obtain the identity of the S-CSCF 28S currently serving the user element 16 (step 204). Since the user element 16 is not currently in the MS 12, the HSS 34 will respond with the attributes required for selection of an I-CSCF by the I-CSCF 28I (step 204). The HSS 34 may also provide the URI associated with the MS client 20 of the user element 16. The I-CSCF 28I will identify an S-CSCF 28S based on the attributes and send an Invite having the URI of the user element 16 to the selected S-CSCF 28S (step 206). The S-CSCF 28S will access the HSS 34 to obtain the subscriber profile associated with the user element 16 based on the MSISDN or the URI (step 208). The HSS 34 will recognize that the user element 16 is not being served by the MS 12 and that the incoming call should be routed to the CCF 30. This information is also provided to the S-CSCF 28S in response to the subscriber profile query (step 208). This access will effectively set the S-CSCF 28S and the HSS 34 in association with the user element 16. The S-CSCF 28S will then forward the Invite having the URI to the CCF 30 (step 210) according to the subscriber profile.

To identify the location of the user element 16, the CCF 30 will initially access the HSS 34 to determine the location of the user element 16 within the MS 12 (step 212). The HSS 34 will indicate that the user element 16 is not within the MS 12 (step 212). As such, the CCF 30 will access the HLR 32 to determine where the user element 16 is within the CS 14 (step 214). In this instance, the CS client 18 of the user element 16 is being served by the VMSC 22V, which has registered with the HLR 32 as the currently serving MSC for the user element 16. Accordingly, the HLR 32 will indicate that the user element 16 is roaming in the CS 14 (step 214). In response, the CCF 30 will determine to route the call via the CS 14 and assign a CSRN, which corresponds to the GMSC 22G of the CS 14 (step 216). The CCF 30 may send a SIP 302 Moved Temporarily message having the CSRN to the S-CSCF 28S (step 218), which will forward the 302 Moved Temporarily message to the I-CSCF 28I (step 220). The I-CSCF 28I will further forward the 302 Moved Temporarily message to the media gateway controller 24 (step 222). The media gateway controller 24 will then initiate an IAM having the CSRN toward the GMSC 22G (step 224). An advanced intelligent network (AI) trigger may be used to identify an incoming IAM having the CSRN (step 226). In response to the AI trigger, the GMSC 22G will be configured to send a CCF query having the CSRN to the CCF 30 to obtain the MSISDN for the user element 16 (step 228). The CCF 30 will map the CSRN to the MSISDN, which was provided in an earlier Invite (step 230), and provide the MSISDN for the user element 16 to the GMSC 22G in a Connect message (step 232).

Armed with the MSISDN, the GMSC 22G can now send an HLR query to the HLR 32 to obtain routing information for the user element 16 (step 234). The HLR 32 will provide a CS identifier (CSI), which is configured to instruct the GMSC 22G to once again access the CCF 30 (step 236). The GMSC 22G will then update the CCF 30 (step 238), which will update the session state for the incoming call (step 240). The CCF 30 will then send a Continue message back to the GMSC 22G (step 242), which will provide another HLR query having the CSI (step 244). To obtain routing information for the call, the HLR 32 will send a Mobile Subscriber Routing Number (MSRN) query to the VMSC 22V to obtain a temporary MSRN for the user element 16 (step 246). The temporary MSRN is a routing number that is temporarily assigned to the user element for routing of the session to the VMSC 22V. The VMSC 22V will send the MSRN back to the HLR 32 in an Acknowledgement message (ACK) (step 248). The HLR 32 will forward the MSRN to the GMSC 22G in another Acknowledgement message (step 250).

At this point, the GMSC 22G has the temporary MSRN for the user element 16, and will send an IAM to the VMSC 22V (step 252). The VMSC 22V will initiate alerting of the user element 16 (not shown). After any requisite call signaling, a bearer path is established between the CS client 18 of the user element 16 and the called party's device via the GMSC 22G and the VMSC 22V (step 254). The call signaling path may be maintained through the CCF 30, S-CSCF 28S, I-CSCF 28I, and the media gateway controller 24 if so desired, in addition to the GMSC 22G and the VMSC 22V.

Figure 4:
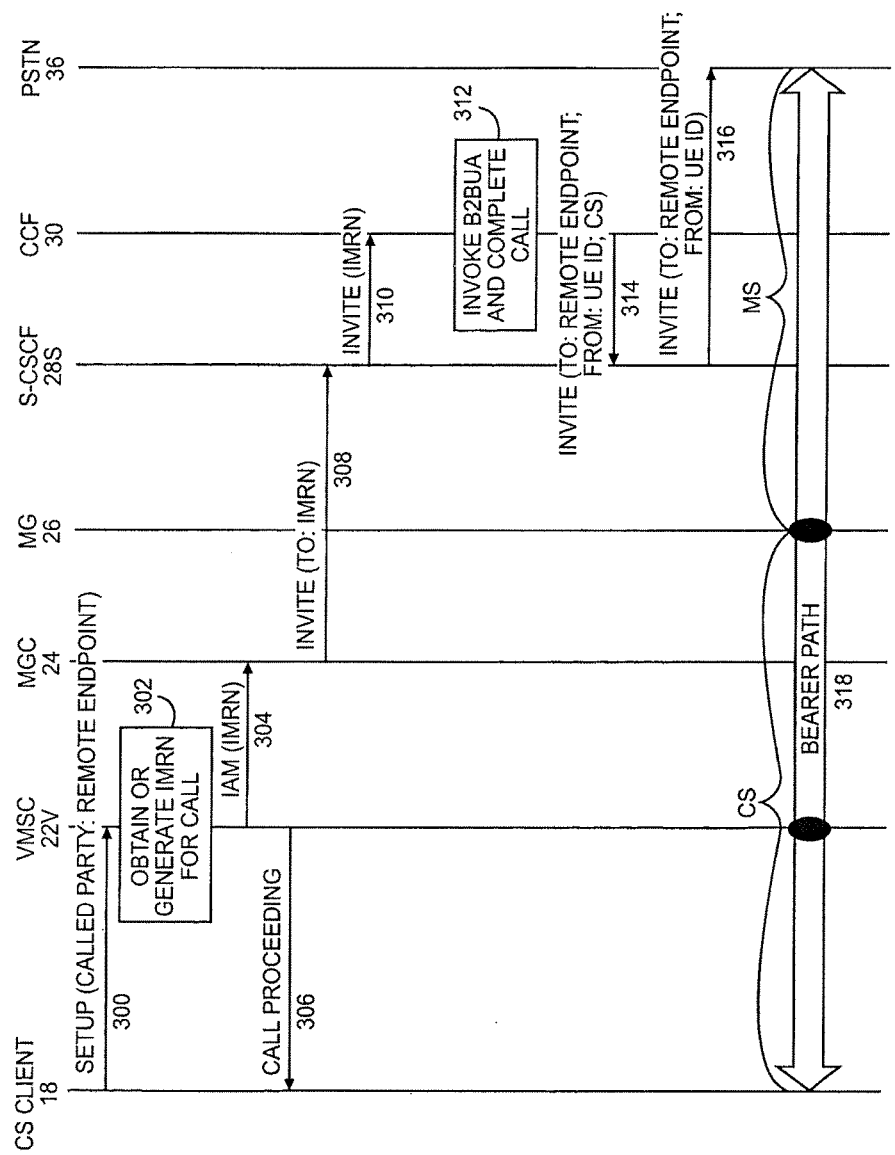
FIG. 4 shows a communication flow illustrating originating a call via the circuit-switched subsystem according to one embodiment of the present invention.

With reference to FIG. 4, a communication flow is provided to illustrate origination of a call toward the PSTN 36 from the CS client 18 of the user element 16 via the CS 14. Initially, the CS client 18 will send a call setup message to its supporting VMSC 22V (step 300). In response, the VMSC 22V will obtain the IMRN from the CCF 30 or generate the IMRN based on provisioned information (step 302). The IMRN may identify the remote endpoint, the CCF PSI, and the call/session reference information. With the IMRN, the VMSC 22V will send an IAM having the IMRN to the media gateway controller 24 (step 304) and a Call Proceeding message back to the CS client 18 of the user element 16 (step 306). This exchange results in a CS bearer leg being established from the CS client 18 to the media gateway 26 via the VMSC 22V.

The media gateway controller 24 acts as a gateway to the MS 12 for the CS 14, and as a user agent on behalf of the user element 16 in the MS 12. Upon receiving the IAM from the VMSC 22V, the media gateway controller 24 will send an Invite having the IMSC to the S-CSCF 28S via the I-CSCF 28I to initiate establishment of a bearer leg through the MS 12 and between a remote endpoint and the media gateway 26 (step 308). The Invite may also indicate that the call was originated through the CS 14. The S-CSCF 28S will recognize the need to invoke the CCF 30 for the call, and will send the Invite to the CCF 30 (step 310), which will invoke a back-to-back user agent (B2BUA) and then take the necessary steps to complete the call (step 312). The CCF 30 will obtain or determine the ID of the user element 16 as well as the remote endpoint or destination address based on the IMRN.

The CCF 30 will send an Invite back to the S-CSCF 28S to complete the call (step 314). The Invite will now include the address of the remote endpoint or a supporting node with which a packet session can be established. The Invite will identify the media gateway controller 24 of the media gateway 26 as the other endpoint for the packet session that will support the call. The S-CSCF 28S will then send the Invite toward the remote endpoint 36 (step 316). At this point, the traditional session message exchange between the remote endpoint and the media gateway controller 24 will take place through the CCF 30 and the S-CSCF 28S to prepare the respective remote endpoint and media gateway 26 to support the bearer path through the MS 12. The bearer path through the CS 14 is established between the media gateway 26 and CS client of the user element 16. As a result, a bearer path is established between the remote endpoint and the user element 16 via the VMSC 22V and the media gateway 26 (step 318).

Figure 5:
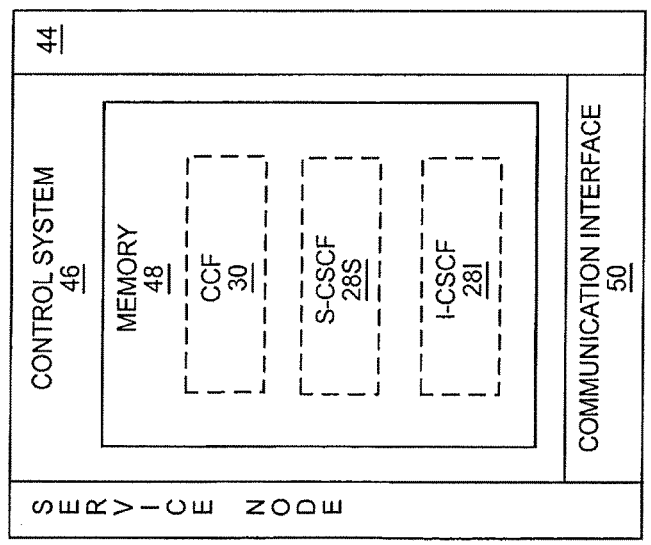
FIG. 5 is a block representation of a service node according to one embodiment of the present invention.

With reference to FIG. 5, a service node 44 is provided according to one embodiment of the present invention. The service node 44 may reside in the MS 12 and include a control system 46 and associated memory 48 to provide the functionality for any one or a combination of the following: the CCF 30, the I-CSCF 28I, and the S-CSCF 28S. The control system 46 will also be associated with a communication interface 50 to facilitate communications with any entity affiliated with the MS 12 or appropriately associated networks.

Figure 6:
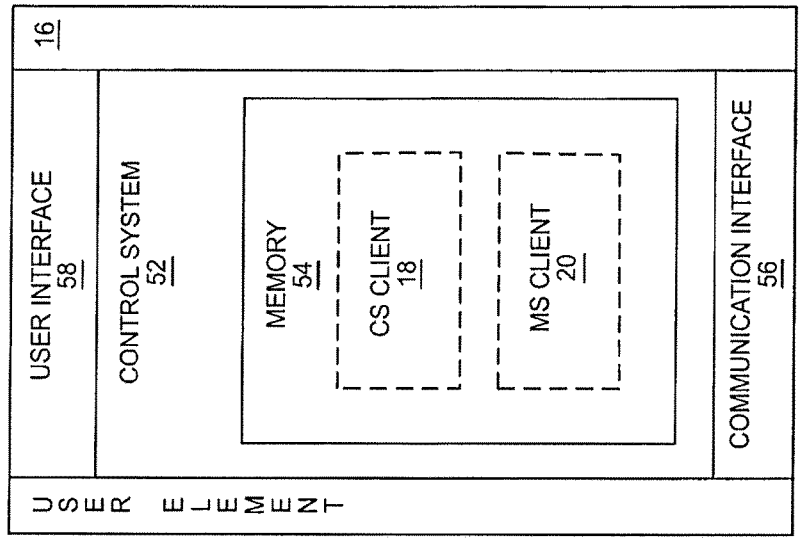
FIG. 6 is a block representation of a user element according to one embodiment of the present invention.

With reference to FIG. 6, a block representation of a user element 16 is provided. The user element 16 may include a control system 52 having sufficient memory 54 to support operation of the CS client 18 and the MS client 20. The control system 52 will cooperate closely with a communication interface 56 to allow the CS client 18 and the MS client 20 to facilitate communications over the CS 14 or the MS 12 as described above. The control system 52 may also be associated with a user interface 58, which will facilitate interaction with a user. The user interface 58 may include a microphone and speaker to facilitate voice communications with the user, as well as a keypad and display to allow the user to input and view information.

Those skilled in the art will recognize improvements and modifications to the preferred embodiments of the present invention. All such improvements and modifications are considered within the scope of the concepts disclosed herein and the claims that follow.

What is claimed is:

1. A method for routing an incoming call, the method comprising:
   receiving in a first domain, by a continuity control function (CCF) executing on an application server from a serving call session control function (S-CSCF), an invite message identifying a user element;
   terminating the invite message on a first signaling leg in the first domain by the CCF functioning as a Back-to-Back User Agent (B2BUA) on the application server;
   sending, by the CCF to a home location register (HLR), a first message identifying the user element and indicating that an incoming call intended for the user element has been routed to the CCF in the first domain;
   receiving, by the CCF, an inter-domain routing number for the CCF to use to route the incoming call into a second domain, wherein the inter-domain routing number identifies a visited mobile switching center (VMSC) in the second domain; and
   sending, by the CCF functioning as the B2BUA on the application server, a second message on a second signaling leg, where the second message is used to route the incoming call to the second domain using the interdomain routing number that identifies the VMSC, obtained in the step of receiving the interdomain routing number, wherein the second domain is a circuit-switched subsystem and the first domain is a multimedia subsystem.

2. The method of claim 1, wherein the CCF provides the inter-domain routing number to route the incoming call into the second domain from the first domain, and wherein the inter-domain routing number is released after routing the incoming call.

3. The method of claim 1, comprising receiving a third message indicating that the incoming call has been routed to a gateway node for the second domain and effecting routing of the incoming call to the user element via the gateway node.

4. The method of claim 3, wherein effecting routing of the incoming call to the user element further comprises obtaining an address associated with the user element in the circuit-switched subsystem and sending a session request toward the user element.

5. The method of claim 1, further comprising identifying a location of the user element and determining to route the incoming call to the user element via the second domain based on the location.

6. The method of claim 1, further comprising anchoring call signaling for the incoming call in the multimedia subsystem.

7. The method of claim 2, wherein the invite message is received and the inter-domain routing number is provided from the circuit-switched subsystem.

8. The method of claim 1, wherein the application server comprises a media gateway controller associated with a media gateway to the multimedia subsystem from the circuit-switched subsystem.

9. An application server, comprising:
   a processor configured to execute a continuity control function (CCF) configured to:
   receive an invite message in a first domain from a serving call session control function (S-CSCF), the invite message identifying a user element;
   terminate the invite message on a first signaling leg in the first domain, wherein the CCF is configured to function as a Back-to-Back User Agent (B2BUA) to terminate the invite message on the first signaling leg;
   send, by the CCF to a home location register (HLR), a first message identifying the user element and indicating that an incoming call intended for the user element has been routed to the CCF in the first domain;
   receive, by the CCF, an inter-domain routing number for the CCF to use to route the incoming call into a second domain, wherein the inter-domain routing number identifies a visited mobile switching center (VMSC) in the second domain; and
   send, by the CCF functioning as the B2BUA on the application server a second message on a second signaling leg, where the second message is at least partially used to route the incoming call to the second domain using the interdomain routing number that identifies the VMSC, obtained in the step of receiving the interdomain routing number, wherein the second domain is a circuit-switched subsystem and the first domain is a multimedia subsystem.

10. The application server of claim 9, wherein the CCF is further configured to:
    provide the inter-domain routing number to route the incoming call into the second domain from the first domain; and
    release the inter-domain routing number after routing the incoming call.

11. The application server of claim 10, wherein the CCF is further configured to:
    receive a third message indicating that the incoming call has been routed to a gateway node for the second domain; and
    effect routing of the incoming call to the user element via the gateway node.

12. The application server of claim 11, wherein to effect routing of the incoming call to the user element via the gateway node, the CCF is further configured to:
    obtain an address associated with the user element in the circuit-switched subsystem; and
    send a session request toward the user element.

13. The application server of claim 9, wherein the CCF is further configured to identify a location of the user element and determine to route the incoming call to the user element via the second domain based on the location.

14. The application server of claim 9, wherein the CCF is further adapted to anchor call signaling for the incoming call in the multimedia subsystem.

15. The application server of claim 10, wherein the invite message is received in and the inter-domain routing number is provided from the circuit-switched subsystem.

16. The application server of claim 9, wherein the application server comprises a media gateway controller associated with a media gateway to the multimedia subsystem from the circuit-switched subsystem.

17. The method of claim 1, wherein the multimedia system is an internet protocol multimedia system.

18. The application server of claim 9, wherein the multimedia system is an internet protocol multimedia system.

19. The application server of claim 9, wherein the B2BUA terminates the first signaling leg of the incoming call toward a calling party's device and establishes the second signaling leg toward a client of the user element in the second domain.

20. The application server of claim 14, wherein anchoring call signaling for the incoming call in the multimedia subsystem comprises terminating an incoming session from a calling device to the multimedia subsystem and initiating an outgoing session to the circuit-switched subsystem based on the terminated incoming session and the inter-domain routing number.

* * * * *